United States Patent
Wang et al.

(10) Patent No.: US 9,083,954 B2
(45) Date of Patent: Jul. 14, 2015

(54) VIDEO PROCESSING METHOD AND SYSTEM AND RELATED DEVICE

(71) Applicant: HUAWEI TECHNOLOGIES CO., LTD., Shenzhen, Guangdong (CN)

(72) Inventors: Pulin Wang, Shenzhen (CN); Yongning Qin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/080,085

(22) Filed: Nov. 14, 2013

(65) Prior Publication Data

US 2014/0072051 A1    Mar. 13, 2014

Related U.S. Application Data

(63) Continuation of application No. PCT/CN2012/078913, filed on Jul. 20, 2012.

(30) Foreign Application Priority Data

Nov. 2, 2011    (CN) .......................... 2011 1 0342292

(51) Int. Cl.
*H04N 19/583*    (2014.01)
*H04N 19/61*    (2014.01)
(Continued)

(52) U.S. Cl.
CPC ......... *H04N 19/00733* (2013.01); *H04N 19/12* (2014.11); *H04N 19/61* (2014.11); *H04N 19/85* (2014.11)

(58) Field of Classification Search
CPC . H04N 19/00733; H04N 19/12; H04N 19/61; H04N 19/85
USPC .......................................................... 375/240
See application file for complete search history.

(56) References Cited

U.S. PATENT DOCUMENTS 5,263,119 A * 11/1993 Tanaka et al. ................. 704/223
5,802,218 A    9/1998 Brailean
(Continued)

FOREIGN PATENT DOCUMENTS

CA    2644379 A1    6/2009
CN    1138401 A    12/1996
(Continued)

OTHER PUBLICATIONS

"Series H: Audiovisual and Multimedia Systems; Infrastructure of audiovisual services—Coding of moving video; Advanced Video Coding for Generic Audiovisual Services," Recommendation H.264, International Telecommunication Union (Mar. 2010).
(Continued)

*Primary Examiner* — Christopher S Kelley
*Assistant Examiner* — Asmamaw G Tarko
(74) *Attorney, Agent, or Firm* — Leydig, Voit & Mayer, Ltd.

(57) ABSTRACT

A video processing method and system and a related device are disclosed, an encoder sends a method for compressing a pixel value of a video image to a decoder, the method includes a mapping between a pixel value of the video image before compression and a pixel value of the video image after the compression; compressing, by the encoder according to the method for compressing a pixel value, the pixel value of the video image to obtain a video image to be encoded; encoding, by the encoder, the video image to be encoded to obtain a video image encoded stream; and sending, by the encoder, the video image encoded stream to the decoder, the decoder receives and decodes the video image encoded stream to obtain a decoded video image, and decompresses a pixel value of the decoded video image to restore the pixel value of the video image before compression.

21 Claims, 3 Drawing Sheets

(51) Int. Cl.
*H04N 19/12* (2014.01)
*H04N 19/85* (2014.01)

(56) References Cited

U.S. PATENT DOCUMENTS

| | | | | |
|---|---|---|---|---|
| 5,808,683 | A * | 9/1998 | Tong et al. | 375/240.11 |
| 5,878,168 | A * | 3/1999 | Kondo et al. | 382/232 |
| 5,889,891 | A * | 3/1999 | Gersho et al. | 382/253 |
| 2003/0103667 | A1* | 6/2003 | Soliman | 382/157 |
| 2004/0017852 | A1* | 1/2004 | Garrido et al. | 375/240.16 |
| 2006/0115088 | A1* | 6/2006 | Valentine et al. | 380/270 |
| 2006/0139287 | A1* | 6/2006 | Kim et al. | 345/98 |
| 2006/0291720 | A1* | 12/2006 | Malvar et al. | 382/166 |
| 2007/0171981 | A1* | 7/2007 | Qi | 375/240.24 |
| 2008/0137733 | A1 | 6/2008 | Fabre et al. | |
| 2008/0247463 | A1* | 10/2008 | Buttimer et al. | 375/240.12 |
| 2010/0158104 | A1* | 6/2010 | Lin et al. | 375/240.2 |
| 2010/0231426 | A1 | 9/2010 | Van Der Vleuten | |
| 2010/0284462 | A1* | 11/2010 | Ye et al. | 375/240.12 |
| 2011/0032392 | A1* | 2/2011 | Litvinov et al. | 348/241 |
| 2011/0063409 | A1* | 3/2011 | Hannuksela | 348/42 |
| 2011/0129012 | A1* | 6/2011 | Erlandson | 375/240.01 |
| 2011/0249756 | A1* | 10/2011 | Doepke | 375/240.24 |
| 2011/0286514 | A1* | 11/2011 | Newman | 375/240.2 |
| 2011/0299604 | A1* | 12/2011 | Price et al. | 375/240.26 |
| 2012/0014450 | A1* | 1/2012 | Ma et al. | 375/240.16 |
| 2012/0023249 | A1* | 1/2012 | Chen et al. | 709/231 |
| 2012/0114172 | A1* | 5/2012 | Du et al. | 382/103 |
| 2012/0155532 | A1* | 6/2012 | Puri et al. | 375/240.02 |
| 2012/0170659 | A1* | 7/2012 | Chaudhury et al. | 375/240.16 |
| 2012/0177121 | A1* | 7/2012 | Tripathi et al. | 375/240.16 |
| 2012/0183039 | A1* | 7/2012 | Rajamani et al. | 375/240.02 |
| 2013/0077685 | A1* | 3/2013 | Chen et al. | 375/240.14 |
| 2013/0077687 | A1* | 3/2013 | Wang et al. | 375/240.15 |
| 2013/0110506 | A1* | 5/2013 | Norvell et al. | 704/205 |
| 2013/0230097 | A1* | 9/2013 | Sole Rojals et al. | 375/240.02 |
| 2013/0294500 | A1* | 11/2013 | Wang | 375/240.02 |
| 2013/0342646 | A1* | 12/2013 | Suh et al. | 348/43 |
| 2014/0301477 | A1* | 10/2014 | Deshpande | 375/240.25 |

FOREIGN PATENT DOCUMENTS

| | | |
|---|---|---|
| CN | 1610377 A | 4/2005 |
| CN | 101193321 A | 6/2008 |
| CN | 101218827 A | 7/2008 |
| CN | 101335902 A | 12/2008 |
| CN | 101472182 A | 7/2009 |
| CN | 101513073 A | 8/2009 |
| CN | 101668196 A | 3/2010 |
| CN | 101690228 A | 3/2010 |
| WO | WO 2008026145 A2 | 3/2008 |
| WO | WO 2009003885 A2 | 1/2009 |

OTHER PUBLICATIONS

"Transmission of Auxiliary Chromo Information for Upsampling," JVT-D071, Joint Video Team (JVT) of ISO/IEC MPEG & ITU-T VCEG (ISO/IEC JTC1/SC29/WG11 and ITU-T SG16 Q.6), 4th Meeting: Klagenfurt, Austria (Jul. 22-26, 2002).

* cited by examiner

VIDEO PROCESSING METHOD AND SYSTEM AND RELATED DEVICE

CROSS-REFERENCE TO RELATED APPLICATIONS

This application is a continuation of International Patent Application No. PCT/CN2012/078913, filed on Jul. 20, 2012, which claims priority to Chinese Patent Application No. 201110342292.3, filed on Nov. 2, 2011, both of which are hereby incorporated by reference in their entireties.

TECHNICAL FIELD

The present invention relates to the field of video processing technologies, and in particular, to a video processing method and system and a related device.

BACKGROUND

In a video communication application, a compression degree of a video image is closely related to transmission channel bandwidth of the video image. That is, after an encoder encodes the video image, a bit rate of an obtained compressed code stream cannot exceed the transmission channel bandwidth. Otherwise, code stream data may be lost, thereby resulting in poor quality of a video image decoded by a decoder. Therefore, the encoder generally encodes the video image by using a certain encoding method, so as to ensure that the bit rate of the obtained compressed code stream does not exceed the transmission channel bandwidth.

H.264 is a video codec standard established by the International Telecommunication Union Telecommunication Standardization Sector. Currently, almost all video devices support the H.264 codec standard. When the transmission channel bandwidth is high, the quality of a video image encoded by an encoder according to the H.264 standard can be better ensured, and the compression impairment of the video image is not obvious. However, when the transmission channel bandwidth is low, the compression degree of the video image encoded by the encoder according to the H.264 standard is higher. Accordingly, the compression impairment of the video image is larger, thereby resulting in lower quality of the video image decoded by the decoder. In a practical application, when the transmission channel bandwidth is low, a quantization parameter QP value in the encoder commonly increases during encoding according to the H.264 standard to ensure that the bit rate of the compressed code stream after being encoded according to the H.264 standard does not exceed the transmission channel bandwidth. The greater the QP value is, the smaller the bit rate of the compressed code stream after being encoded according to the H.264 standard is, and the larger the compression impairment of the video image is. This leads to poorer quality of the video image decoded by the decoder. For example, image blocking artifact is obvious, motion streaking is serious, a pit exists, a false edge exists, and color distortion exists.

Therefore, how to improve the compression quality of a video image when transmission channel bandwidth is low is an important research direction.

SUMMARY

Embodiments of the present invention provide a video processing method and system and a related device, so as to improve compression quality of a video image when transmission channel bandwidth is low.

A video processing method, including:
sending, by an encoder, a method for compressing a pixel value of a video image to a decoder, where the method for compressing a pixel value includes a mapping between a pixel value of the video image before compression and a pixel value of the video image after the compression;
compressing, by the encoder, the pixel value of the video image according to the method for compressing a pixel value of the video image to obtain a video image to be encoded;
encoding, by the encoder, the video image to be encoded to obtain a video image encoded stream; and
sending, by the encoder, the video image encoded stream to the decoder, so that the decoder receives and decodes the video image encoded stream to obtain a decoded video image and then decompresses a pixel value of the decoded video image according to the method for compressing a pixel value of the video image to restore the pixel value of the video image before compression from the pixel value of the decoded video image.

A video processing method, including:
receiving and recording, by a decoder, a method for compressing a pixel value of a video image, where the method for compressing a pixel value of the video image is sent by an encoder and includes a mapping between a pixel value of the video image before compression and a pixel value of the video image after the compression;
receiving, by the decoder, a video image encoded stream sent by the encoder, where the video image encoded stream is sent after the encoder compresses the pixel value of the video image according to the method for compressing a pixel value of the video image to obtain a video image to be encoded and encodes the video image to be encoded;
decoding, by the decoder, the video image encoded stream to obtain a decoded video image; and
decompressing, by the decoder, a pixel value of the decoded video image according to the method for compressing a pixel value of the video image to restore the pixel value of the video image before compression from the pixel value of the decoded video image.

An encoder, including:
a notifying unit, configured to send a method for compressing a pixel value of a video image to a decoder, where the method for compressing a pixel value includes a mapping between a pixel value of the video image before compression and a pixel value of the video image after the compression;
a compressing unit, configured to compress the pixel value of the video image according to the method for compressing a pixel value of the video image to obtain a video image to be encoded;
an encoding unit, configured to encode the video image to be encoded to obtain a video image encoded stream; and
a sending unit, configured to send the video image encoded stream to the decoder, so that the decoder receives and decodes the video image encoded stream to obtain a decoded video image and then decompresses a pixel value of the decoded video image according to the method for compressing a pixel value of the video image to restore the pixel value of the video image before compression from the pixel value of the decoded video image.

A decoder, including:
a recording unit, configured to receive and record a method for compressing a pixel value of a video image, where the method for compressing a pixel value of the video image is sent by an encoder and includes a mapping between a pixel value of the video image before compression and a pixel value of the video image after the compression;

a receiving unit, configured to receive a video image encoded stream sent by the encoder, where the video image encoded stream is sent after the encoder compresses the pixel value of the video image according to the method for compressing a pixel value of the video image to obtain a video image to be encoded and encodes the video image to be encoded;

a decoding unit, configured to decode the video image encoded stream to obtain a decoded video image; and a restoring unit, configured to decompress a pixel value of the decoded video image according to the method for compressing a pixel value of the video image to restore the pixel value of the video image before compression from the pixel value of the decoded video image.

A video processing system, including an encoder and a decoder, where:

the encoder is configured to send a method for compressing a pixel value of a video image to the decoder, compress a pixel value of the video image according to the method for compressing a pixel value of the video image to obtain a video image to be encoded, encode the video image to be encoded to obtain a video image encoded stream, and send the video image encoded stream to the decoder, where the method for compressing a pixel value of the video image includes a mapping between a pixel value of the video image before compression and a pixel value of the video image after the compression; and the decoder is configured to receive and record the method for compressing a pixel value of the video image, where the method for compressing a pixel value of the video image is sent by the encoder, receive the video image encoded stream sent by the encoder, decode the video image encoded stream to obtain a decoded video image, and decompress a pixel value of the decoded video image according to the method for compressing a pixel value of the video image to restore the pixel value of the video image before compression from the pixel value of the decoded video image.

In the embodiments of the present invention, an encoder first sends a method for compressing a pixel value of a video image to a decoder, then compresses a pixel value of the video image according to the method for compressing a pixel value to obtain a video image to be encoded, encodes the video image to be encoded to obtain a video image encoded stream, and sends the video image encoded stream to the decoder; and the decoder may first receive and record the method for compressing a pixel value of the video image, where the method for compressing a pixel value of the video image is sent by the encoder, then receive the video image encoded stream sent by the encoder, decode the video image encoded stream to obtain a decoded video image, and further decompress a pixel value of the decoded video image according to the stored method for compressing a pixel value of the video image, so as to restore the pixel value of the video image before compression from the pixel value of the decoded video image. The encoder compresses the pixel value of the video image according to the method for compressing a pixel value of the video image to obtain the video image to be encoded and then performs encoding. In this way, when transmission channel bandwidth is low, compression impairment caused when the encoder encodes the video image to be encoded can be reduced, so that compression quality of the video image can be improved when the transmission channel bandwidth is low.

BRIEF DESCRIPTION OF DRAWINGS

To illustrate the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

A video processing method and system and a related device that are provided in the embodiments of the present invention are capable of improving compression quality of a video image when transmission channel bandwidth is low. Specific embodiments are given for description in the following.

Embodiment 1

Figure 1:
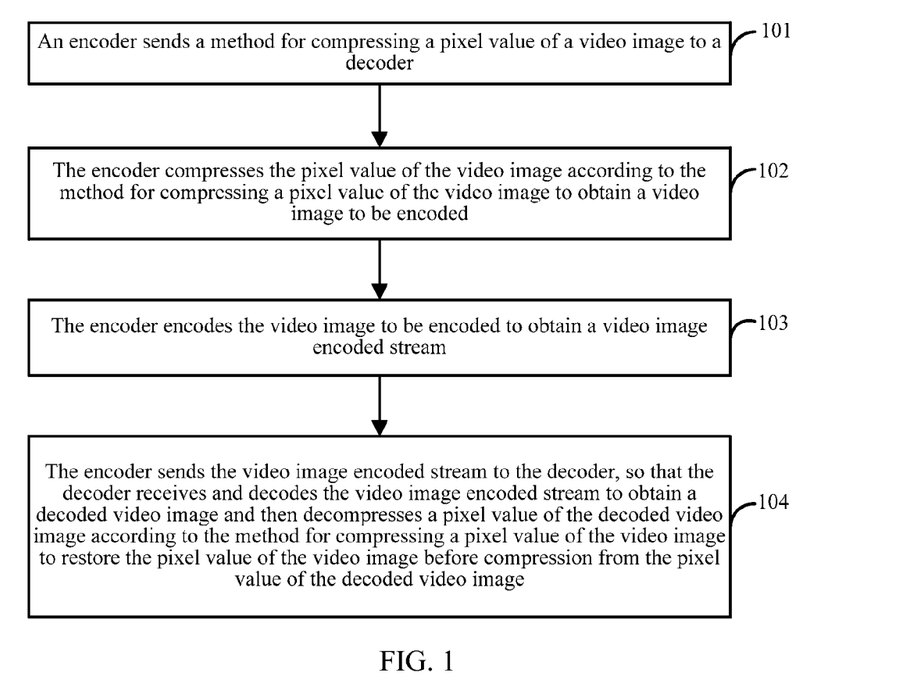
FIG. 1 is a flowchart of a video processing method according to an embodiment of the present invention.

FIG. 1 illustrates a flowchart of a video processing method according to an embodiment of the present invention. As shown in FIG. 1, the video processing method may include the following steps:

101. An encoder sends a method for compressing a pixel value of a video image to a decoder.

In the embodiment of the present invention, the method for compressing a pixel value of the video image may include a mapping between a pixel value of the video image before compression and a pixel value of the video image after the compression. The involved method for compressing a pixel value of the video image in the embodiment of the present invention is to be described in detail subsequently through specific embodiments. In the embodiment of the present invention, the pixel value of the video image may be expressed by using a certain length of bits (for example 11111111) or may be expressed by using a decimal value (for example 256), which is not limited in the embodiment of the present invention.

The encoder may use a transmission channel of the video image, a network channel, or another dedicated channel to send the method for compressing a pixel value of the video image to the decoder, which is not limited in the embodiment of the present invention.

102. The encoder compresses the pixel value of the video image according to the method for compressing a pixel value of the video image to obtain a video image to be encoded.

In the embodiment of the present invention, the purpose of compressing, by the encoder, the pixel value of the video image according to the method for compressing a pixel value of the video image is to narrow the range of the pixel value of the video image, so that the probability that an encoding coefficient is 0 is high in a subsequent encoding quantization process of the video image to be encoded, thereby reducing impairment of the video image caused in the encoding quantization process.

103. The encoder encodes the video image to be encoded to obtain a video image encoded stream.

As an optional implementation manner, the encoder may encode, according to the H.264 standard, the video image to be encoded to obtain the video image encoded stream; or, the encoder may adopt another encoding method to encode the video image to be encoded to obtain the video image encoded stream, which is not limited in the embodiment of the present invention.

104. The encoder sends the video image encoded stream to the decoder, so that the decoder receives and decodes the video image encoded stream to obtain a decoded video image and then decompresses a pixel value of the decoded video image according to the method for compressing a pixel value of the video image to restore the pixel value of the video image before compression from the pixel value of the decoded video image.

As an optional implementation manner, in the embodiment of the present invention, one or more methods for compressing a pixel value of a video image may be preconfigured on the encoder and the decoder. In addition, an identity ID is marked for each method for compressing a pixel value of a video image. An identity ID of each method for compressing a pixel value of a video image is different from others, so that the encoder and the decoder can identify, by using the identity ID, a corresponding method for compressing a pixel value of a video image.

In the embodiment of the present invention, assuming that the pixel value of the video image before the compression is A, if A is mapped to different pixel values of the video image after compression, different methods for compressing a pixel value of a video image are used.

Based on the preceding implementation manner, the encoder may select an identity ID of any one of the methods for compressing a pixel value of a video image and send the selected identity ID to the decoder. In this way, the method for compressing a pixel value of the video image is sent to the decoder. Accordingly, after receiving the identity ID, the decoder may determine the method for compressing a pixel value of the video image, where the method for compressing a pixel value of the video image corresponds to the identity ID. Further, after receiving the video image encoded stream sent by the encoder, the decoder may decode the video image encoded stream to obtain a decoded video image and decompress a pixel value of the decoded video image according to the method for compressing a pixel value of the video image to restore the pixel value of the video image before compression from the pixel value of the decoded video image, where the method for compressing a pixel value of the video image corresponds to the identity ID. According to the implementation manner, the encoder does not need to send the entire content of the method for compressing a pixel value of the video image to the decoder, but only needs to send the identity ID (the identity ID may be 1, 2, 3, . . . , and the like) of the method for compressing a pixel value of the video image to the decoder. This greatly reduces the amount of transmitted data that is transmitted between the encoder and the decoder and used to express the method for compressing a pixel value of the video image, and achieves purposes of reducing a data loss rate and improving a data transmission speed.

In a practical application, a stored method for compressing a pixel value of a video image in the encoder may also be sent by the decoder to the encoder for storage. For example, the decoder may send an identity ID of preconfigured one or more methods for compressing a pixel value of a video image to the encoder for storage, which is not limited in the embodiment of the present invention.

As an optional implementation manner, in the embodiment of the present invention, the sending, by the encoder, the method for compressing a pixel value of the video image to the decoder may also be implemented by using the following manner, that is:

1. The encoder may encapsulate the method for compressing a pixel value of the video image in a valid payload Payload data field of an H.264 standard-based supplemental enhancement information (Supplemental Enhancement Information, SEI) packet.

2. The encoder sends the decoder the SEI packet in which the method for compressing a pixel value of the video image is encapsulated.

Subsequently in the embodiments of the present invention, an implementation manner of sending, by using the H.264 standard-based SEI packet, the method for compressing a pixel value of the video image is to be further introduced in detail.

In Embodiment 1 of the present invention, an encoder first sends a method for compressing a pixel value of a video image to a decoder, then compresses a pixel value of the video image according to the method for compressing a pixel value to obtain a video image to be encoded, encodes the video image to be encoded to obtain a video image encoded stream, and sends the video image encoded stream to the decoder, so that the decoder may first receive and store the method for compressing a pixel value of the video image, where the method for compressing a pixel value of the video image is sent by the encoder, then receive the video image encoded stream sent by the encoder, decode the video image encoded stream to obtain a decoded video image, and further decompress a pixel value of the decoded video image according to the stored method for compressing a pixel value of the video image, so as to restore the pixel value of the video image before compression from the pixel value of the decoded video image. The encoder compresses the pixel value of the video image according to the method for compressing a pixel value of the video image to obtain the video image to be encoded and then performs encoding. In this way, when transmission channel bandwidth is low, compression impairment caused when the encoder encodes the video image to be encoded can be reduced, so that compression quality of the video image can be improved when the transmission channel bandwidth is low.

Embodiment 2

Figure 2:
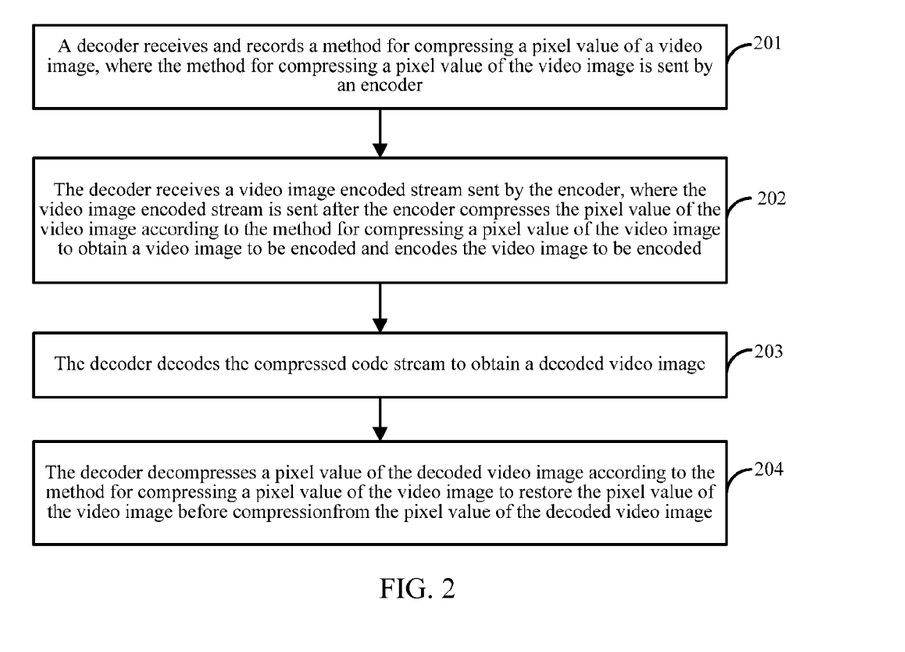
FIG. 2 is a flowchart of another video processing method according to an embodiment of the present invention.

FIG. 2 illustrates a flowchart of a video processing method according to an embodiment of the present invention. Corresponding to Embodiment 1 in which the video processing method provided in the embodiment of the present invention is introduced from the perspective of an encoder, Embodiment 2 introduces the video processing method provided in the embodiment of the present invention from the perspective of a decoder. As shown in FIG. 2, the video processing method may include the following steps:

201. A decoder receives and records a method for compressing a pixel value of a video image, where the method for compressing a pixel value of the video image is sent by an encoder.

In the embodiment of the present invention, the decoder may use a transmission channel of the video image, a network channel, or another dedicated channel to receive the method for compressing a pixel value of the video image, where the method for compressing a pixel value of the video image is sent by the encoder, which is not limited in the embodiment of the present invention.

As described in Embodiment 1, the encoder may send an identity ID of the method for compressing a pixel value of the video image to the decoder so as to send the method for compressing a pixel value of the video image to the decoder. Accordingly, the decoder may receive and record the identity ID sent by the encoder. Further, the decoder may determine, according to the identity ID sent by the encoder, a corresponding method for compressing a pixel value of the video image.

Still as described in Embodiment 1, the encoder may send, by using an H.264 standard-based SEI packet, the method for compressing a pixel value of the video image to the decoder. Accordingly, the decoder may receive the H.264 standard-based SEI packet sent by the encoder, obtain the method for compressing a pixel value of the video image by parsing the SEI packet, and then record the method for compressing a pixel value of the video image.

In the embodiment of the present invention, the method for compressing a pixel value of the video image may include a mapping between a pixel value of the video image before compression and a pixel value of the video image after the compression, where the method for compressing a pixel value of the video image is sent by the encoder.

202. The decoder receives a video image encoded stream sent by the encoder, where the video image encoded stream is sent after the encoder compresses the pixel value of the video image according to the method for compressing a pixel value of the video image to obtain a video image to be encoded and encodes the video image to be encoded.

203. The decoder decodes the video image encoded stream to obtain a decoded video image.

As an optional implementation manner, the decoder may decode the video image encoded stream according to the H.264 standard to obtain the decoded video image; or, the decoder may adopt another decoding method to decode the video image encoded stream to obtain the decoded video image, which is not limited in the embodiment of the present invention as long as the decoding method adopted by the decoder is a reverse processing method of an encoding method adopted by the encoder.

204. The decoder decompresses a pixel value of the decoded video image according to the method for compressing a pixel value of the video image to restore the pixel value of the video image before compression from the pixel value of the decoded video image.

In Embodiment 2 of the present invention, a decoder may first receive and record a method for compressing a pixel value of a video image, where the method for compressing a pixel value of the video image is sent by an encoder, then receive a video image encoded stream sent by the encoder, decode the video image encoded stream to obtain a decoded video image, and further decompress a pixel value of the decoded video image according to the stored method for compressing a pixel value of the video image to restore the pixel value of the video image before compression from the pixel value of the decoded video image. The video image encoded stream received by the decoder is obtained after a pixel value of the video image is compressed and encoded by the encoder according to the method for compressing a pixel value of the video image. In this way, when transmission channel bandwidth is low, compression impairment caused when the encoder encodes the video image to be encoded can be reduced, so that compression quality of the video image can be improved when the transmission channel bandwidth is low.

Embodiment 3

In Embodiment 3 of the present invention, a method for compressing a pixel value of a video image is described by using examples.

As described in the preceding embodiments of the present invention, the method for compressing a pixel value of the video image may include a mapping between a pixel value of the video image before compression and a pixel value of the video image after the compression. In a practical application, the pixel value of the video image is commonly expressed by using eight bits; that is, the value range is 0-255. Therefore, an encoder may establish, by adopting a manner of rightward moving a bit or adopting a division manner, the mapping between the pixel value of the video image before the compression and the pixel value of the video image after the compression. Specifically, the encoder may rightward move the pixel value of the video image before the compression by at least one bit to obtain the pixel value of the video image after the compression; or, the encoder may obtain the pixel value of the video image before the compression by multiplying $1/n$ by the pixel value of the video image before the compression, where n is a natural number. In this way, the mapping between the pixel value of the video image before the compression and the pixel value of the video image after the compression can be established.

For example, the encoder may obtain the pixel value of the video image after the compression by multiplying, by using the division manner, $½$ (that is, n=2) by the pixel value of the video image before the compression. For example, if the pixel value of the video image before the compression is 128, $128*(½)$ equals 64; that is, the method for compressing a pixel value of the video image includes a mapping between the pixel value 128 of the video image before the compression and the pixel value 64 of the video image after the compression: 128→64.

For another example, the encoder may rightward move the pixel value of the video image before the compression by two bits to obtain the pixel value of the video image after the compression. For example, if the pixel value of the video image before the compression is 220 (binary 11011100), the pixel value becomes 55 (binary 00110111) after the pixel value is rightward moved by two bits; that is, the method for compressing a pixel value of the video image includes a mapping between the pixel value 220 of the video image before the compression and the pixel value 55 of the video image after the compression: 220→55.

In the embodiment of the present invention, after the encoder sends a decoder the method for compressing a pixel value of the video image, where the method for compressing a pixel value of the video image includes mappings, such as 128→64 and 220→55, between the pixel value of the video image before the compression and the pixel value of the video image after the compression, the decoder may first record the method for compressing a pixel value of the video image. After receiving a video image encoded stream sent by the encoder and decoding the video image encoded stream to obtain a decoded video image, the decoder may further decompress a pixel value of the decoded video image according to the recorded method for compressing a pixel value of the video image, so as to restore the pixel value of the video image before compression from the pixel value of the decoded video image.

Specifically, after obtaining the decoded video image, the decoder may calculate, according to the recorded mapping between the pixel value of the video image before the compression and the pixel value of the video image after the compression, a mapping of the pixel value of the video image after the compression to the pixel value of the video image before the compression, and restore the pixel value of the video image before the compression from the pixel value of the decoded video image according to the mapping between the pixel value of the video image after the compression and the pixel value of the video image before the compression.

For example, if the pixel value of the decoded video image is 64 (that is, the pixel value 64 of the video image after the compression), the decoder may calculate the mapping 64→128 between the pixel value of the video image after the compression and the pixel value of the video image before the compression according to the recorded mapping 128→64 (that is, the method for compressing a pixel value of the video image) between the pixel value of the video image before the compression and the pixel value of the video image after the compression, and restore the pixel value 128 of the video image (that is, the pixel value 128 of the video image before the compression) from the pixel value 64 of the decoded video image (that is, the pixel value 64 of the video image after the compression).

For another example, if the pixel value of the decoded video image is 55 (that is, the pixel value 55 of the video image after the compression), the decoder may calculate the mapping 55→220 between the pixel value of the video image after the compression and the pixel value of the video image before the compression according to the recorded mapping 220→55 (that is, the method for compressing a pixel value of the video image) between the pixel value of the video image before the compression and the pixel value of the video image after the compression, and restore the pixel value 220 of the video image (that is, the pixel value 220 of the video image before the compression) from the pixel value 55 of the decoded video image (that is, the pixel value 55 of the video image after the compression).

In the embodiment of the present invention, compressing a pixel value of a video image by an encoder brings compression impairment to some extent to the quality of the video image. However, it is proved through experiments that when transmission channel bandwidth is low, compressing the pixel value of the video image does far more good than harm through comparison between obtained quality improvements of the video image and the compression impairment brought to the quality of the video image. That is, more benefits can be obtained at the expense of some effects.

Embodiment 4

In Embodiment 4 of the present invention, another method for compressing a pixel value of a video image is described by using examples.

In the embodiment of the present invention, the mapping (that is, the method for compressing a pixel value of the video image) between the pixel value of the video image before the compression and the pixel value of the video image after the compression described in the foregoing embodiments may specifically include: a mapping of the pixel value of the video image after the compression to the pixel value of the video image before the compression. Same as the foregoing embodiments, the pixel value of the video image after the compression may be obtained by rightward moving the pixel value of the video image before the compression by at least one bit by an encoder; or, the pixel value of the video image after the compression may be obtained by multiplying 1/n by the pixel value of the video image before the compression by the encoder, where n is a natural number. In this way, the mapping of the pixel value of the video image after the compression to the pixel value of the video image before the compression can be established.

For example, the encoder may obtain the pixel value of the video image after the compression by multiplying, by using a division manner, ¼ (that is, n=4) by the pixel value of the video image before the compression. For example, if the pixel value of the video image before the compression is 128, 128*(¼) equals 32; that is, the method for compressing a pixel value of the video image specifically includes a mapping 32→128 of the pixel value 32 of the video image after the compression to the pixel value 128 of the video image before the compression.

For another example, the encoder may rightward move the pixel value of the video image before the compression by two bits to obtain the pixel value of the video image after the compression. For example, if the pixel value of the video image before the compression is 220 (binary 11011100), the pixel value becomes 55 (binary 00110111) after the pixel value is rightward moved by two bits; that is, the method for compressing a pixel value of the video image may specifically include a mapping 55→220 of the pixel value 55 of the video image after the compression to the pixel value 220 of the video image before the compression.

In the embodiment of the present invention, after the encoder sends a decoder the method for compressing a pixel value of the video image, where the method for compressing a pixel value of the video image includes mappings, such as 32→128 and 55→220, of the pixel value of the video image after the compression to the pixel value of the video image before the compression, the decoder may first record the method for compressing a pixel value of the video image. After receiving a video image encoded stream sent by the encoder and decoding the video image encoded stream to obtain a decoded video image, the decoder may directly decompress a pixel value of the decoded video image according to the recorded method for compressing a pixel value of the video image.

For example, if the pixel value of the decoded video image is 32 (that is, the pixel value 32 of the video image after the compression), the decoder may directly restore the pixel value 128 of the video image (that is, the pixel value 128 of the video image before the compression) from the pixel value 32 of the video image after the compression according to the recorded mapping 32→128 (that is, the method for compressing a pixel value of the video image) of the pixel value of the video image after the compression to the pixel value of the video image before the compression.

For another example, if the pixel value of the decoded video image is 55 (that is, the pixel value 55 of the video image after the compression), the decoder may directly restore the pixel value 220 of the video image (that is, the pixel value 220 of the video image before the compression) the pixel value 55 of the video image after the compression according to the recorded mapping 55→220 (that is, the method for compressing a pixel value of the video image) of the pixel value of the video image after the compression to the pixel value of the video image before the compression.

Compared with Embodiment 3, the method for compressing a pixel value of the video image that is provided in Embodiment 4 allows a decoder to directly restore the pixel value of the video image before compression from a pixel value of a decoded video image according to a mapping of a pixel value of the video image after compression to a pixel value of the video image before the compression. In this way, the operation of restoring the pixel value by the decoder can be reduced, the time of restoring the pixel value of the video image by the decoder is shortened, and efficiency of restoring the pixel value of the video image by the decoder can be improved.

Embodiment 5

In Embodiment 5 of the present invention, another method for compressing a pixel value of a video image is described by using examples.

Figure 3:
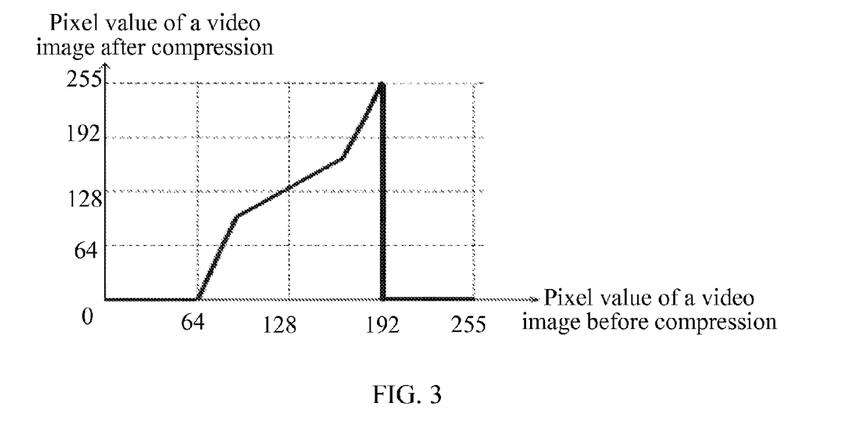
FIG. 3 is a diagram of a mapping between a pixel value of a video image before compression and a pixel value of the video image after the compression according to an embodiment of the present invention.

In Embodiment 5 of the present invention, a mapping between a pixel value of the video image before compression and a pixel value of the video image after the compression is shown in FIG. 3, where the mapping is included in the method for compressing a pixel value of the video image. All pixel values of the video image before the compression that are in the ranges of [0, 63] and [192, 255] are compressed to 0 (that is, the pixel value of the video image after the compression is 0). The rest of pixel values of the video image before the compression are compressed according to a curve shown in FIG. 3. In this way, the method for compressing a pixel value of the video image is established, where the method for compressing a pixel value of the video image includes the mapping between the pixel value of the video image before the compression and the pixel value of the video image after the compression.

Figure 4:
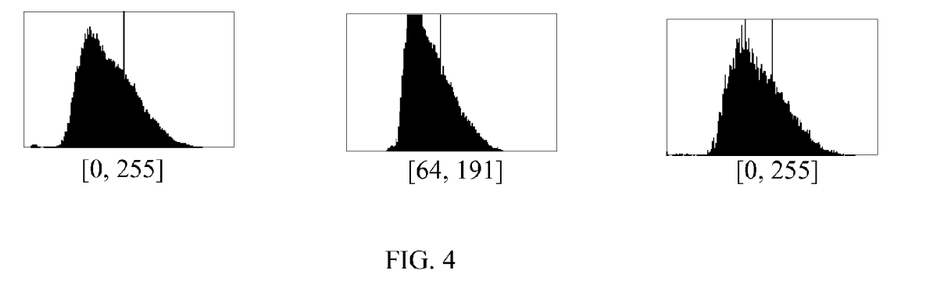
FIG. 4 is a schematic diagram of processes of compressing a pixel value of a video image and restoring the pixel value of the video image according to an embodiment of the present invention.

FIG. 4 illustrates a schematic diagram of processes of compressing a pixel value of a video image whose pixel value is in the range of [0, 255] by an encoder and restoring the pixel value by a decoder. In the process shown in FIG. 4, the encoder compresses a pixel value of the video image whose pixel value is in the range of [0, 255] to [64, 191] according to the method for compressing a pixel value of the video image shown in FIG. 3, and the decoder decompresses, according to the method for compressing a pixel value of the video image shown in FIG. 3, a pixel value of a decoded video image in the range of [64, 191] to restore the range of [0, 255] from the pixel value of the decoded video image.

When transmission channel bandwidth is low, compressing a pixel value of a video image by using the method for compressing a pixel value of the video image is capable of reducing compression impairment caused when an encoder encodes a video image to be encoded, so that compression quality of the video image can be improved when the transmission channel bandwidth is low.

Embodiment 6

In Embodiment 6 of the present invention, a method for sending a method for compressing a pixel value of a video image is described by using examples. After determining a method for compressing a pixel value of a video image, an encoder can send the method to a decoder by using a certain method. For example, the encoder may send, by using an H.264 standard-based SEI packet, the method for compressing a pixel value of the video image to the decoder. This method is in full compliance with the standard in the industry and is universal.

A SEI packet is an H.264 standard-based supplemental enhancement information packet and plays a supplementary role in a decoding, displaying, or another process. In a codec process, the SEI packet can be used to transmit some supplemental information, and the SEI packet can be further used to transmit some private information. In the embodiment of the present invention, an encapsulation format of the H.264 standard-based SEI packet may be shown in table 1:

TABLE 1

| Encapsulation format of an H.264 standard-based SEI packet | | | | | |
|---|---|---|---|---|---|
| 12 byte | 1 byte | 1 byte | n byte | n byte | 1 byte |
| Rtp header | n-type | SEI PT | PT size | Payload data | R-trail |

Introduction to each part of the H.264 standard-based SEI packet is as follows:

1. Rtp header: It indicates an RTP header and occupies 12 bytes.

2. n-type: It indicates a NALU header byte of an RTP packet, occupies one byte, and is divided into three bit fields: F, NRI, and Type, where the value of F is 0; NRI indicates a priority of a network abstraction layer (Network Abstraction Layer, NAL), and a value of NRI ranges from 0-3; and Type indicates a type of NAL, and the value of Type is 6.

3. SEI PT: It indicates a payload type value of the SEI packet. The length of bytes occupied by SEI PT is a variable value, which is the same as the following PT size, the minimum value is one byte, and there is no limit to the maximum value. Currently, in the H.264 protocol, a specific defined value of SEI PT is 0-35, and other values except for 0-35 are not defined. One byte value can indicate a maximum value 255. Therefore, when the SEI packet is used to send the method for compressing a pixel value of the video image, SEI PT may use a value greater than 35, such as 112.

4. PT size: It indicates a length of bytes of the payload data of the SEI packet, does not include its own length, and also does not include a length of rbsp_trailing_bits. The length of bytes occupied by PT size is a variable value, the minimum value is one byte, and there is no limit to the maximum value. Each byte indicates a maximum value 255, and the value of the last byte must be less than 255. For example, if it is assumed that the payload data of a SEI packet is 500 bytes, the PT size occupies 2 bytes, the first byte is 255 (0xFF), and the second byte is 245 (0xF5).

5. Payload data: It indicates payload data of the SEI packet, that is, customized data, where a method for compressing a pixel value of a video image can be encapsulated in the Payload data of the SEI packet.

6. R-trail: It indicates the rbsp_trailing_bits of RBSP, and 0x80 is filled.

Currently, the value of SEI PT that is in the range of 0-35 has been used in the H.264 standard. Therefore, in the embodiment of the present invention, a value greater than 35, such as 112, can be used as a SEI PT value when the method for compressing a pixel value of the video image is sent, where the method for compressing a pixel value of the video image is encapsulated in the Payload data field of the SEI packet. An example of a format of the Payload data field is shown in table 2:

TABLE 2

| Format of Payload data field of a SEI packet | | | | | |
|---|---|---|---|---|---|
| 0 | 1 | 2 | 3 | ... | 255 |

256 Byte

A range of pixel values of a video image is [0, 255], and therefore 256 bytes (byte) can be used in the Payload data field of the SEI packet. Each byte is numbered 0, 1, 2, ..., 255 in sequence, and a mapping between the number of each byte and a pixel value of the video image before compression is established. In addition, the pixel value of the video image before the compression is stored in a byte of a corresponding serial number in the Payload data field. For example, if the pixel value of the video image before the compression is 100, and a pixel value of the video image after the compression is 80, in the Payload data field of the SEI packet, a value stored in a byte that is numbered 80 is the pixel value 100 of the video image before the compression, and so on.

In the embodiment of the present invention, the method for compressing a pixel value of the video image may be adjusted in real-time as required. Actual environment is changeable, and content of a video image is also changeable. Different methods for compressing a pixel value of a video image may be enabled according to different video images.

In the embodiment of the present invention, the method for compressing a pixel value of the video image may be enabled or disabled. During initialization, several methods for compressing a pixel value of a video image may be determined, and the encoder may send, by using a SEI packet, the several methods for compressing a pixel value of a video image to the decoder.

In a practical codec process, if the encoder needs to change a currently used method for compressing a pixel value of a video image, before enabling a new method for compressing a pixel value of a video image, the encoder sends, by using a SEI packet, the new method for compressing a pixel value of the video image to be enabled to the decoder, and then an encoder end uses the new method for compressing a pixel value of the video image to compress the pixel value of the video image. After receiving and parsing the new method for compressing a pixel value of the video image, a decoder end records the new method for compressing a pixel value of the video image and is capable of using the new method for compressing a pixel value of the video image subsequently to restore the pixel value of the video image before compression from a pixel value of a decoded video image.

If the method for compressing a pixel value of the video image needs to be disabled, before stopping operating, the encoder may first notify the decoder of disabling processing information by using the SEI packet. Then the encoder end disables the method for compressing a pixel value of the video image, and performs encoding according to the normal H.264 encoding standard. After receiving the disabling processing information, the decoder end disables restoring processing for the pixel value of the decoded video image.

If a method for compressing a pixel value of a video image needs to be enabled again, before operating, the encoder determines a method for compressing a pixel value of a video image to be enabled, and then may notify, by using the SEI packet, the decoder end of enabling restoring processing of a pixel value. Further, the encoder compresses the pixel value of the video image according to the currently determined method for compressing a pixel value of the video image and then performs encoding. The decoder end may restore the pixel value of the video image before compression from the pixel value of the decoded video image according to the enabled method for compressing a pixel value of the video image.

In the embodiment of the present invention, a pixel value of a video image before encoding is compressed, a method for compressing a pixel value of a video image is sent to a decoder, then the compressed video image is encoded, and the decoder restores from a pixel value of a decoded video image. In the embodiment of the present invention, compression quality of a video image can be effectively improved when transmission channel bandwidth is low. It can be very convenient to send, by using an H.264 standard-based SEI packet, the method for compressing a pixel value of the video image. In the embodiment of the present invention, favorable improvements of the compression quality of a video image can be obtained only by adding simple processing on an encoder and the decoder.

Further, in the embodiment of the present invention, the encoder may use a connection-oriented reliable transmission service method provided in the Transmission Control Protocol (Transmission Control Protocol, TCP) to send the decoder an H.264 standard-based SEI packet in which the method for compressing a pixel value of the video image is encapsulated, and wait for a response message that is returned by the decoder and used to acknowledge successful receiving of the SEI packet. If the encoder receives the response message that is returned by the decoder and used to acknowledge the successful receiving of the SEI packet, the encoder does not need to resend the SEI packet. Otherwise, if the encoder does not receive the response message that is returned by the decoder and used to acknowledge the successful receiving of the SEI packet, the encoder considers that the SEI packet is lost in the sending process, and the encoder needs to resend the SEI packet to the decoder until the encoder receives the response message that is returned by the decoder and used to acknowledge the successful receiving of the SEI packet. In this way, it can be ensured that the decoder receives the method for compressing a pixel value of the video image, where the method for compressing a pixel value of the video image is sent by the encoder.

Further, in the embodiment of the present invention, the encoder may use the connection-oriented reliable transmission service method provided in TCP to send a compressed code stream packet to the decoder, and wait for an acknowledgment response message returned by the decoder. If the encoder receives the acknowledgment response message returned by the decoder, the encoder does not need to resend the compressed code stream packet sent previously. Otherwise, if the encoder does not receive the acknowledgment response message returned by the decoder, the encoder considers that the compressed code stream packet sent previously is lost in the sending process, and the encoder needs to resend the decoder the compressed code stream sent previously until the encoder receives the acknowledgment response message returned by the decoder. In this way, it can be ensured that the decoder receives every compressed code stream packet sent by the encoder.

Embodiment 7

Figure 5:
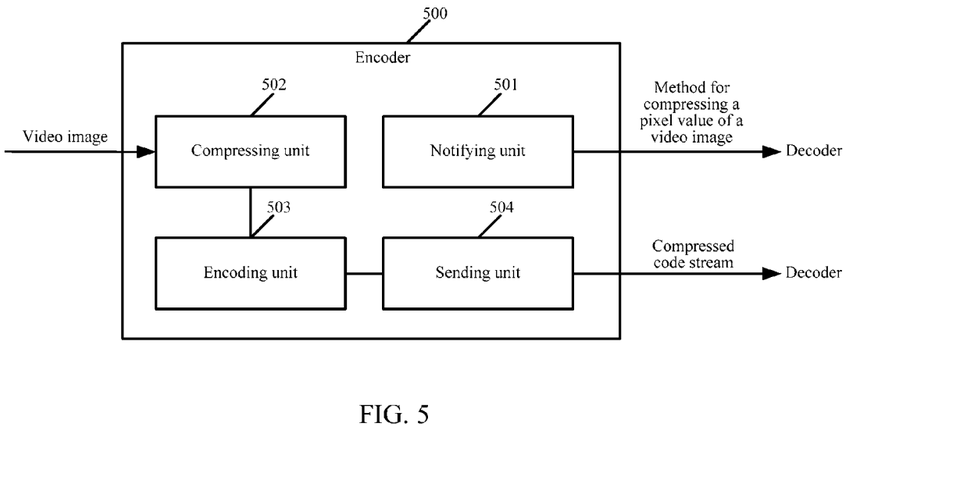
FIG. 5 is a structural diagram of an encoder according to an embodiment of the present invention.

FIG. 5 illustrates a structural diagram of an encoder according to an embodiment of the present invention. As shown in FIG. 5, the encoder 500 may include: a notifying unit 501, a compressing unit 502, an encoding unit 503, and a sending unit 504.

The notifying unit 501 is configured to send a method for compressing a pixel value of a video image to a decoder.

In the embodiment of the present invention, the method for compressing a pixel value of the video image may include a mapping between a pixel value of the video image before compression and a pixel value of the video image after the compression.

In the embodiment of the present invention, the pixel value of the video image after the compression is obtained by rightward moving the pixel value of the video image before the compression by at least one bit; or, the pixel value of the video image after the compression is obtained by multiplying 1/n by the pixel value of the video image before the compression, where n is a natural number.

The compressing unit 502 is configured to compress the pixel value of the video image according to the method for compressing a pixel value of the video image to obtain a video image to be encoded.

The encoding unit 503 is configured to encode the video image to be encoded to obtain a video image encoded stream.

The sending unit 504 is configured to send the video image encoded stream to the decoder, so that the decoder receives and decodes the video image encoded stream to obtain a decoded video image and then decompresses a pixel value of the decoded video image according to the method for compressing a pixel value of the video image to restore the pixel value of the video image before compression from the pixel value of the decoded video image.

As an optional implementation manner, the notifying unit 501 may be specifically configured to encapsulate the method for compressing a pixel value of the video image in a valid payload Payload data field of an H.264 standard-based supplemental enhancement information SEI packet, and send the decoder the SEI packet in which the method for compressing a pixel value of the video image is encapsulated. It can be very convenient to send, by using the H.264 standard-based SEI packet, the method for compressing a pixel value of the video image, and this method is universal.

As another optional implementation manner, the notifying unit 501 may be specifically configured to send an identity ID of the method for compressing a pixel value of the video image to the decoder, where an identity ID of each method for compressing a pixel value of a video image is different from others. According to the implementation manner, the encoder does not need to send the entire content of the method for compressing a pixel value of the video image to the decoder, but only needs to send the identity ID (the identity ID may be 1, 2, 3, . . . , and the like) of the method for compressing a pixel value of the video image to the decoder. This greatly reduces the amount of transmitted data that is transmitted between the encoder and the decoder and used to express the method for compressing a pixel value of the video image, and achieves purposes of reducing a data loss rate and improving a data transmission speed.

As another optional implementation manner, the encoding unit 503 is specifically configured to encode, according to the H.264 standard, the video image to be encoded to obtain the video image encoded stream.

In Embodiment 7 of the present invention, a notifying unit 501 first sends a method for compressing a pixel value of a video image to a decoder; then a compressing unit 502 compresses a pixel value of the video image according to the method for compressing a pixel value of the video image to obtain a video image to be encoded; further an encoding unit 503 may encode the video image to be encoded to obtain a video image encoded stream; and further a sending unit 504 sends the video image encoded stream to the decoder, so that the decoder is capable of first receiving and storing the method for compressing a pixel value of the video image, where the method for compressing a pixel value of the video image is sent by the encoder, then receiving the video image encoded stream sent by the encoder, decoding the video image encoded stream to obtain a decoded video image, and further decompressing a pixel value of the decoded video image according to the stored method for compressing a pixel value of the video image, so as to restore the pixel value of the video image before compression from the pixel value of the decoded video image. The compressing unit 502 compresses the pixel value of the video image according to the method for compressing a pixel value of the video image to obtain the video image to be encoded and then the encoding unit 503 performs encoding. In this way, when transmission channel bandwidth is low, compression impairment caused when the encoder encodes the video image to be encoded can be reduced, so that compression quality of the video image can be improved when the transmission channel bandwidth is low.

Embodiment 8

Figure 6:
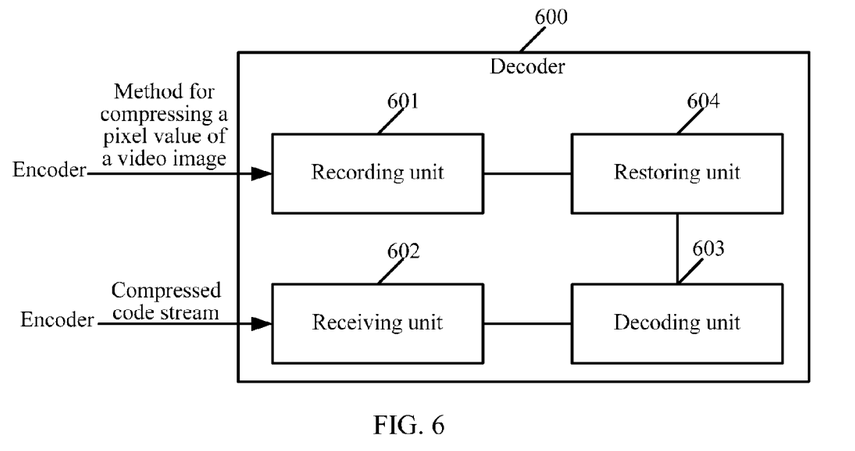
FIG. 6 is a structural diagram of a decoder according to an embodiment of the present invention.

FIG. 6 illustrates a structural diagram of a decoder according to an embodiment of the present invention. As shown in FIG. 6, the decoder 600 may include: a recording unit 601, a receiving unit 602, a decoding unit 603, and a restoring unit 604.

The recording unit 601 is configured to receive and record a method for compressing a pixel value of a video image, where the method for compressing a pixel value of the video image is sent by an encoder.

In the embodiment of the present invention, the method for compressing a pixel value of the video image may include a mapping between a pixel value of the video image before compression and a pixel value of the video image after the compression.

In the embodiment of the present invention, the pixel value of the video image after the compression is obtained by rightward moving the pixel value of the video image before the compression by at least one bit; or, the pixel value of the video image after the compression is obtained by multiplying 1/n by the pixel value of the video image before the compression, where n is a natural number.

The receiving unit 602 is further configured to receive a video image encoded stream sent by the encoder, where the video image encoded stream is sent after the encoder compresses the pixel value of the video image according to the method for compressing a pixel value of the video image to obtain a video image to be encoded and encodes the video image to be encoded.

The decoding unit 603 is configured to decode the video image encoded stream to obtain a decoded video image.

The restoring unit 604 is configured to decompress a pixel value of the decoded video image according to the method for compressing a pixel value of the video image to restore the pixel value of the video image before compression from the pixel value of the decoded video image.

As an optional implementation manner, the recording unit 601 may be specifically configured to receive an H.264 standard-based supplemental enhancement information SEI packet sent by the encoder, where the method for compressing a pixel value of the video image is encapsulated in a valid payload Payload data field of the SEI packet, and obtain the method for compressing a pixel value of the video image by parsing the SEI packet and record the method for compressing a pixel value of the video image. It can be very convenient for the encoder to send, by using the H.264 standard-based SEI packet, the method for compressing a pixel value of the video image, and this method is universal.

As an optional implementation manner, the recording unit 601 may be specifically configured to receive an identity ID of the method for compressing a pixel value of the video image, where the method for compressing a pixel value of the video image is sent by the encoder, and record the identity ID of the method for compressing a pixel value of the video image, where an identity ID of each method for compressing a pixel value of a video image is different from others. According to the implementation manner, the decoder does not need to receive the entire content of the method for compressing a pixel value of the video image, where the method for compressing a pixel value of the video image is sent by the encoder, but only needs to receive the identity ID (the identity ID may be 1, 2, 3, . . . , and the like) of the method for compressing a pixel value of the video image, where the identity ID is sent by the encoder. This greatly reduces the amount of transmitted data that is transmitted between the encoder and the decoder and used to express the method for compressing a pixel value of the video image, and achieves purposes of reducing a data loss rate and improving a data transmission speed.

As an optional implementation manner, the decoding unit 603 may be specifically configured to decode, according to the H.264 standard, the video image encoded stream to obtain a decoded video image.

In the embodiment of the present invention, if the method for compressing a pixel value of the video image includes a mapping of the pixel value of the video image before the compression to the pixel value of the video image after the compression, the restoring unit 604 may specifically calculate, according to the mapping of the pixel value of the video image before the compression to the pixel value of the video image after the compression, a mapping of the pixel value of the video image after the compression to the pixel value of the video image before the compression, and restore the pixel value of the video image before the compression from the pixel value of the decoded video image according to the mapping of the pixel value of the video image after the compression to the pixel value of the video image before the compression.

By comparison, if the method for compressing a pixel value of the video image includes the mapping of the pixel value of the video image after the compression to the pixel value of the video image before the compression, the restoring unit 604 may directly restore the pixel value of the video image before compression from the pixel value of the decoded video image according to the mapping of the pixel value of the video image after the compression to the pixel value of the video image before the compression, and does not need to first calculate, according to the mapping of the pixel value of the video image before the compression to the pixel value of the video image after the compression, the mapping of the pixel value of the video image after the compression to the pixel value of the video image before the compression and then restore the pixel value of the video image before compression from the pixel value of the decoded video image according to the mapping of the pixel value of the video image after the compression to the pixel value of the video image before the compression. That is, if the method for compressing a pixel value includes the mapping of the pixel value of the video image after the compression to the pixel value of the video image before the compression, the operation of restoring the pixel value by the decoder can be reduced, the time of restoring the pixel value of the video image by the decoder is shortened, and efficiency of restoring the pixel value of the video image by the decoder can be improved.

In Embodiment 8 of the present invention, a recording unit 601 may first receive and record a method for compressing a pixel value of a video image, where the method for compressing a pixel value of the video image is sent by an encoder; then a receiving unit 602 receives a video image encoded stream sent by the encoder; and after a decoding unit 603 decodes the video image encoded stream to obtain a decoded video image, a restoring unit 604 further decompresses a pixel value of the decoded video image according to the stored method for compressing a pixel value of the video image to restore the pixel value of the video image before compression from the pixel value of the decoded video image. The video image encoded stream received by the receiving unit 602 is obtained after a pixel value of the video image is compressed and encoded by the encoder according to the method for compressing a pixel value of the video image. In this way, when transmission channel bandwidth is low, compression impairment caused when the encoder encodes the video image to be encoded can be reduced, so that compression quality of the video image can be improved when the transmission channel bandwidth is low.

Embodiment 9

Figure 7:
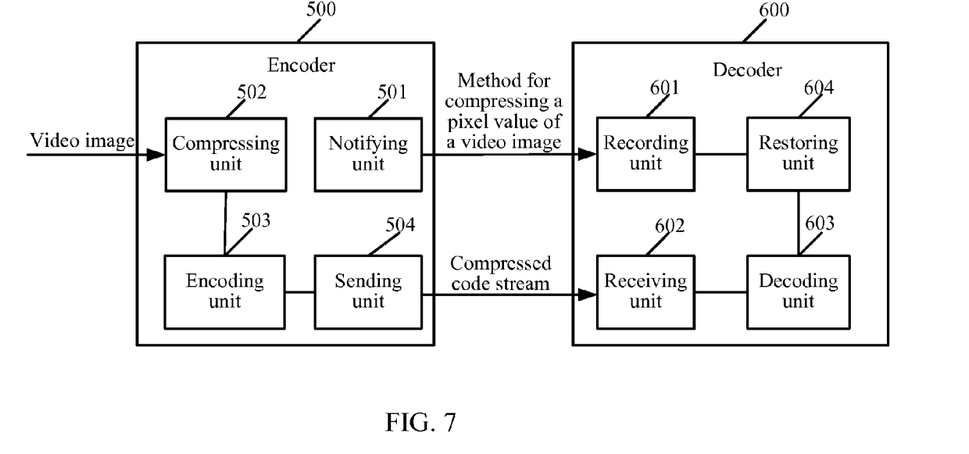
FIG. 7 is a structural diagram of a video processing system according to an embodiment of the present invention.

FIG. 7 illustrates a structural diagram of a video processing system according to an embodiment of the present invention. As shown in FIG. 7, the video processing system may include the encoder 500 of the structure shown in FIG. 5 and the decoder 600 of the structure shown in FIG. 6.

The encoder 500 is configured to send a method for compressing a pixel value of a video image to the decoder 600, compress a pixel value of a video image according to the method for compressing a pixel value to obtain a video image to be encoded, encode the video image to be encoded to obtain a video image encoded stream, and send the video image encoded stream to the decoder 600.

The decoder 600 is configured to receive and record the method for compressing a pixel value of the video image, where the method for compressing a pixel value of the video image is sent by the encoder 500, receive the video image encoded stream sent by the encoder 500, decode the video image encoded stream to obtain a decoded video image, and decompress a pixel value of the decoded video image according to the method for compressing a pixel value of the video image to restore the pixel value of the video image before compression from the pixel value of the decoded video image.

The method for compressing a pixel value of the video image may include a mapping between a pixel value of the video image before compression and a pixel value of the video image after the compression.

The mapping between the pixel value of the video image before the compression and the pixel value of the video image after the compression may specifically include: a mapping of the pixel value of the video image before the compression to the pixel value of the video image after the compression or a mapping of the pixel value of the video image after the compression to the pixel value of the video image before the compression.

The pixel value of the video image after the compression is obtained by rightward moving the pixel value of the video image before the compression by at least one bit; or, the pixel value of the video image after the compression is obtained by multiplying 1/n by the pixel value of the video image before the compression, where n is a natural number.

In Embodiment 9 of the present invention, an encoder 500 first sends a method for compressing a pixel value of a video image to a decoder 600, then compresses a pixel value of the video image according to the method for compressing a pixel value to obtain a video image to be encoded, encodes the video image to be encoded to obtain a video image encoded stream, and sends the video image encoded stream to the decoder 600; and the decoder 600 may first receive and store the method for compressing a pixel value of the video image, where the method for compressing a pixel value of the video image is sent by the encoder 500, then receive the video image encoded stream sent by the encoder 500, decode the video image encoded stream to obtain a decoded video image, and further decompress a pixel value of the decoded video image according to the stored method for compressing a pixel value of the video image, so as to restore the pixel value of the video image before compression from the pixel value of the decoded video image. The encoder 500 compresses the pixel value of the video image according to the method for compressing a pixel value to obtain the video image to be encoded and then performs encoding. In this way, when transmission channel bandwidth is low, compression impairment caused when the encoder encodes the video image to be encoded can be reduced, so that compression quality of the video image can be improved when the transmission channel bandwidth is low.

The foregoing comprehensively describes in detail the video processing method and system and the related device that are provided in the embodiments of the present invention. Practice has proved that a video image processed by using the video processing method and system and the related device that are provided in the embodiments of the present invention has a clearer and more obvious edge contour effect, and especially details in the middle of the video image are clearer. It can be seen that the video processing method and system and the device thereof that are provided in the embodiments of the present invention can improve compression quality of the video image when transmission channel bandwidth is low.

A person of ordinary skill in the art may understand that, all or a part of the steps of the foregoing method embodiments may be implemented by a program instructing relevant hardware. The program may be stored in a computer readable storage medium. When the program runs, the steps of the foregoing method embodiments are performed. The foregoing storage medium includes: any medium that can store program codes, such as a read-only memory (Read-Only Memory, ROM), a random access memory (Random Access Memory, RAM), a magnetic disk, or an optical disk.

A video processing method and system and a related device that are provided in the embodiments of the present invention are introduced in detail in the foregoing. In this specification, specific examples are used for illustrating principles and implementation manners of the present invention. The foregoing descriptions of the embodiments are merely used to help understand the methods and core ideas of the present invention. Meanwhile, a person of ordinary skill in the art may make modifications to the specific implementation manners and application scopes according to the idea of the present invention. In conclusion, the content of this specification should not be construed as a limitation to the present invention.

What is claimed is:

1. A video processing method, comprising:
sending, by an encoder, a method for compressing a pixel value of a video image to a decoder, wherein the method for compressing the pixel value comprises a mapping between a pixel value of the video image before compression and a pixel value of the video image after the compression;
compressing, by the encoder, the pixel value of the video image according to the method for compressing a pixel value of the video image to obtain a video image to be encoded;
encoding, by the encoder, the video image to be encoded to obtain a video image encoded stream; and
sending, by the encoder, the video image encoded stream to the decoder, so that the decoder receives and decodes the video image encoded stream to obtain a decoded video image and then decompresses a pixel value of the decoded video image according to the method for compressing the pixel value of the video image to restore the pixel value of the video image before compression from the pixel value of the decoded video image,
wherein the sending, by the encoder, the method for compressing the pixel value of the video image to the decoder comprises:
sending, by the encoder, an identity ID of the method for compressing the pixel value of the video image to the decoder, wherein different identity IDs represent different methods for compressing the pixel value of the video image.

2. The method according to claim 1, wherein the pixel value of the video image after the compression is obtained by rightward moving the pixel value of the video image before the compression by at least one bit.

3. The method according to claim 1, wherein the pixel value of the video image after the compression is obtained by multiplying 1/n by the pixel value of the video image before the compression, and n is a natural number.

4. The method according to claim 1, wherein the sending, by an encoder, a method for compressing a pixel value of a video image to a decoder comprises:
encapsulating, by the encoder, the method for compressing the pixel value of the video image in a valid payload data field of an H.264 standard-based Supplemental Enhancement Information (SEI) packet; and
sending, by the encoder, to the decoder the SEI packet in which the method for compressing the pixel value of the video image is encapsulated.

5. The method according to claim 1, wherein the encoding, by the encoder, the video image to be encoded to obtain the video image encoded stream comprises:
encoding, by the encoder according to an H.264 standard, the video image to be encoded to obtain the video image encoded stream.

6. A video processing method, comprising:
receiving, by a decoder, a method for compressing a pixel value of a video image, wherein the method for compressing the pixel value of the video image is sent by an encoder and comprises a mapping between a pixel value of the video image before compression and a pixel value of the video image after the compression;
receiving, by the decoder, a video image encoded stream sent by the encoder, wherein the video image encoded stream is sent after the encoder compresses the pixel value of the video image according to the method for compressing the pixel value of the video image to obtain a video image to be encoded and encodes the video image to be encoded;
decoding, by the decoder, the video image encoded stream to obtain a decoded video image; and
decompressing, by the decoder, a pixel value of the decoded video image according to the method for compressing the pixel value of the video image to restore the pixel value of the video image before compression from the pixel value of the decoded video image, wherein the receiving, by the decoder, the method for compressing the pixel value of the video image comprises:

receiving, by the decoder, an identity ID of the method for compressing the pixel value of the video image, wherein the method for compressing the pixel value of the video is sent by the encoder, and different identity IDs resent different methods for compressing the pixel value of the video image; and storing, by the decoder, the identity ID of the method for compressing the pixel value of the video image.

7. The method according to claim 6, wherein the pixel value of the video image after the compression is obtained by rightward moving the pixel value of the video image before the compression by at least one bit.

8. The method according to claim 6, wherein the pixel value of the video image after the compression is obtained by multiplying 1/n by the pixel value of the video image before the compression, and n is a natural number.

9. The method according to claim 6, wherein the receiving, by the decoder, the method for compressing the pixel value of the video image comprises:

receiving, by the decoder, an H.264 standard-based Supplemental Enhancement Information (SEI) packet sent by the encoder, wherein the method for compressing the pixel value of the video image is encapsulated in a valid payload data field of the SEI packet; and obtaining, by the decoder, the method for compressing the pixel value of the video image by parsing the SEI packet, and storing the method for compressing the pixel value of the video image.

10. The method according to claim 6, wherein the decoding, by the decoder, the video image encoded stream to obtain the decoded video image comprises:

decoding, by the decoder according to an H.264 standard, the video image encoded stream to obtain the decoded video image.

11. An encoder, comprising:

a notifying unit, configured to send a method for compressing a pixel value of a video image to a decoder, wherein the method for compressing the pixel value comprises a mapping between a pixel value of the video image before compression and a pixel value of the video image after the compression;

a compressing unit, configured to compress the pixel value of the video image according to the method for compressing the pixel value of the video image to obtain a video image to be encoded;

an encoding unit, configured to encode the video image to be encoded to obtain a video image encoded stream; and a sending unit, configured to send the video image encoded stream to the decoder, so that the decoder receives and decodes the video image encoded stream to obtain a decoded video image and then decompresses a pixel value of the decoded video image according to the method for compressing the pixel value of the video image to restore the pixel value of the video image before compression from the pixel value of the decoded video image, wherein the notifying unit is configured to send an identity ID of the method for compressing the pixel value of the video image to the decoder, and different identity IDs represent different methods for compressing the pixel value of the video image.

12. The encoder according to claim 11, wherein the pixel value of the video image after the compression is obtained by rightward moving the pixel value of the video image before the compression by at least one bit.

13. The encoder according to claim 11, wherein the pixel value of the video image after the compression is obtained by multiplying 1/n by the pixel value of the video image before the compression, and n is a natural number.

14. The encoder according to claim 11, wherein the notifying unit is specifically configured to encapsulate the method for compressing the pixel value of the video image in a valid payload data field of an H.264 standard-based Supplemental Enhancement Information (SEI) packet and send the decoder the SEI packet in which the method for compressing the pixel value is encapsulated.

15. A decoder, comprising:

a recording unit, configured to receive and record a method for compressing a pixel value of a video image, wherein the method for compressing the pixel value of the video image is sent by an encoder and comprises a mapping between a pixel value of the video image before compression and a pixel value of the video image after the compression;

a receiving unit, configured to receive a video image encoded stream sent by the encoder, wherein the video image encoded stream is sent after the encoder compresses the pixel value of the video image according to the method for compressing the pixel value of the video image to obtain a video image to be encoded and encodes the video image to be encoded;

a decoding unit, configured to decode the video image encoded stream to obtain a decoded video image; and a restoring unit, configured to decompress a pixel value of the decoded video image according to the method for compressing the pixel value of the video image to restore the pixel value of the video image before compression from the pixel value of the decoded video image, wherein the recording unit is configured to receive an identity ID of the method for compressing the pixel value of the video image, wherein the method for compressing the pixel value of the video image is sent by the encoder, and recording the identity ID of the method for compressing the pixel value of the video image, wherein different identity IDs represent different methods for compressing the pixel value of the video image.

16. The decoder according to claim 15, wherein the pixel value of the video image after the compression is obtained by rightward moving the pixel value of the video image before the compression by at least one bit; or, the pixel value of the video image after the compression is obtained by multiplying 1/n by the pixel value of the video image before the compression, and n is a natural number.

17. The decoder according to claim 15, wherein the pixel value of the video image after the compression is obtained by multiplying 1/n by the pixel value of the video image before the compression, and n is a natural number.

18. The decoder according to claim 15, wherein the recording unit is specifically configured to receive an H.264 standard-based Supplemental Enhancement Information (SEI) packet sent by the encoder, wherein the method for compressing the pixel value of the video image is encapsulated in a valid payload data field of the SEI packet, and obtain the method for compressing the pixel value of the video image by parsing the SEI packet and recording the method for compressing the pixel value of the video image.

19. A video processing system, comprising an encoder and a decoder, wherein:

the encoder is configured to send a method for compressing a pixel value of a video image to the decoder, compress a pixel value of the video image according to the method for compressing the pixel value of the video image to obtain a video image to be encoded, encode the video image to be encoded to obtain a video image encoded stream, and send the video image encoded stream to the decoder, wherein the method for compressing the pixel value of the video image comprises a mapping between a pixel value of the video image before compression and a pixel value of the video image after the compression; and the decoder is configured to receive and record the method for compressing the pixel value of the video image, wherein the method for compressing the pixel value of the video image is sent by the encoder, receive the video image encoded stream sent by the encoder, decode the video image encoded stream to obtain a decoded video image, and decompress a pixel value of the decoded video image according to the method for compressing the pixel value of the video image to restore the pixel value of the video image before compression from the pixel value of the decoded video image, wherein the encoder configured to send the method for compressing the pixel value of the video image to the decoder comprises:

the encoder sending an identity ID of the method for compressing the pixel value of the video image to the decoder, wherein different identity IDs represent different methods for compressing the pixel value of the video image.

20. The video processing system according to claim 19, wherein the pixel value of the video image after the compression is obtained by rightward moving the pixel value of the video image before the compression by at least one bit.

21. The video processing system according to claim 19, wherein the pixel value of the video image after the compression is obtained by multiplying 1/n by the pixel value of the video image before the compression, and n is a natural number.

* * * * *

UNITED STATES PATENT AND TRADEMARK OFFICE
CERTIFICATE OF CORRECTION

PATENT NO. : 9,083,954 B2  
APPLICATION NO. : 14/080085  
DATED : July 14, 2015  
INVENTOR(S) : Wang et al.

Page 1 of 1

It is certified that error appears in the above-identified patent and that said Letters Patent is hereby corrected as shown below:

In The Claims

Column 21, line 9, "re resent" should read -- represent --.

Signed and Sealed this
Fifteenth Day of December, 2015

Michelle K. Lee
*Director of the United States Patent and Trademark Office*